United States Patent
Asuncion et al.

(10) Patent No.: US 8,020,049 B2
(45) Date of Patent: Sep. 13, 2011

(54) DETECTION OF AND RECOVERY FROM AN ELECTRICAL FAST TRANSIENT/BURST (EFT/B) ON A UNIVERSAL SERIAL BUS (USB) DEVICE

(75) Inventors: John Julius Asuncion, Singapore (SG); Wai Keat Tai, Penang (MY); Shan Chong Tan, Penang (MY); Lian Chun Xu, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 295 days.

(21) Appl. No.: 12/338,898

(22) Filed: Dec. 18, 2008

(65) Prior Publication Data

US 2010/0162054 A1   Jun. 24, 2010

(51) Int. Cl.
  *G06F 11/00* (2006.01)
(52) U.S. Cl. ............. 714/56; 710/313; 714/5.1; 714/43; 714/55
(58) Field of Classification Search .................. 710/313; 714/5, 43, 44, 55, 56, 5.1
See application file for complete search history.

(56) References Cited

U.S. PATENT DOCUMENTS

| | | | |
|---|---|---|---|
| 6,012,103 A * | 1/2000 | Sartore et al. | 710/8 |
| 6,073,193 A * | 6/2000 | Yap | 710/100 |
| 6,101,076 A * | 8/2000 | Tsai et al. | 361/90 |
| 6,249,825 B1 * | 6/2001 | Sartore et al. | 710/8 |
| 6,279,060 B1 * | 8/2001 | Luke et al. | 710/64 |
| 6,415,342 B1 * | 7/2002 | Wahl et al. | 710/100 |
| 6,523,126 B1 * | 2/2003 | Brabenac | 713/323 |
| 6,647,452 B1 * | 11/2003 | Sonoda | 710/305 |
| 6,658,597 B1 * | 12/2003 | Ker et al. | 714/23 |
| 6,738,834 B1 * | 5/2004 | Williams et al. | 710/8 |
| 6,813,672 B1 * | 11/2004 | Kamran et al. | 710/305 |
| 7,043,267 B1 * | 5/2006 | Saotome et al. | 455/557 |
| 7,085,117 B2 * | 8/2006 | Bullock et al. | 361/111 |
| 2001/0017846 A1 * | 8/2001 | Wu | 370/257 |
| 2005/0144345 A1 * | 6/2005 | Nakano | 710/100 |

FOREIGN PATENT DOCUMENTS

| | | |
|---|---|---|
| JP | 2006195778 A2 | 7/2006 |
| JP | 2007047909 A2 | 2/2007 |
| KR | 20010019356 A | 3/2001 |
| WO | 03/023629 A1 | 3/2003 |

OTHER PUBLICATIONS

Joel Lachance, Robert Lawrence, and Steve Stegner; Strategies to Improve Confidence in Immunity Testing under CISPR24; 2001 IEEE; p. 84-88.

* cited by examiner

*Primary Examiner* — Robert W Beausoliel, Jr.
*Assistant Examiner* — Joshua P Lottich

(57) ABSTRACT

An Electrical Fast Transient/Burst (EFT/B) detection and recovery system for a Universal Serial Bus (USB) device. The system includes a USB core and a burst controller. The USB core provides serial communications with a host device through a USB data channel. The burst controller is coupled to the USB core. The burst controller detects an EFT/B event and automatically reconnects the USB core to the host device in response to recognition of a suspend state of the USB core by the host device.

24 Claims, 7 Drawing Sheets

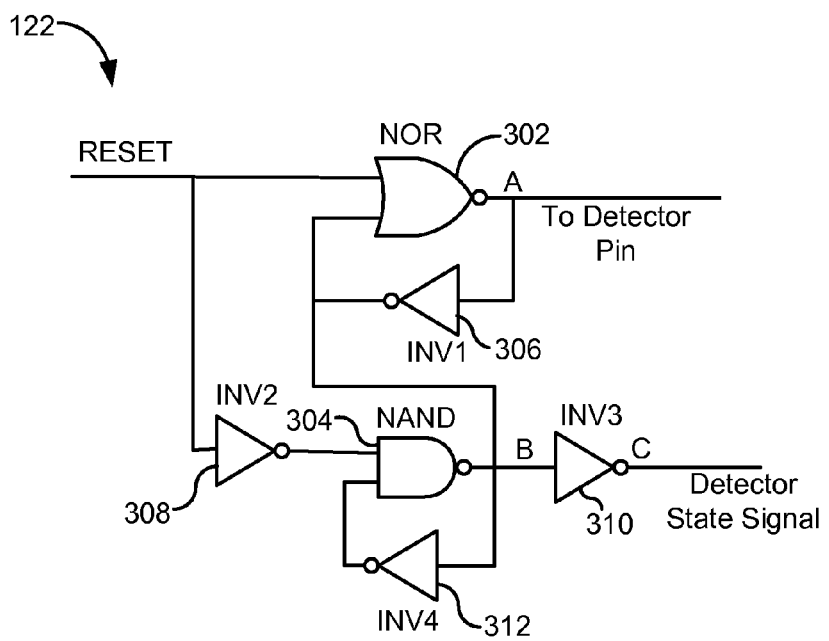
FIG. 4
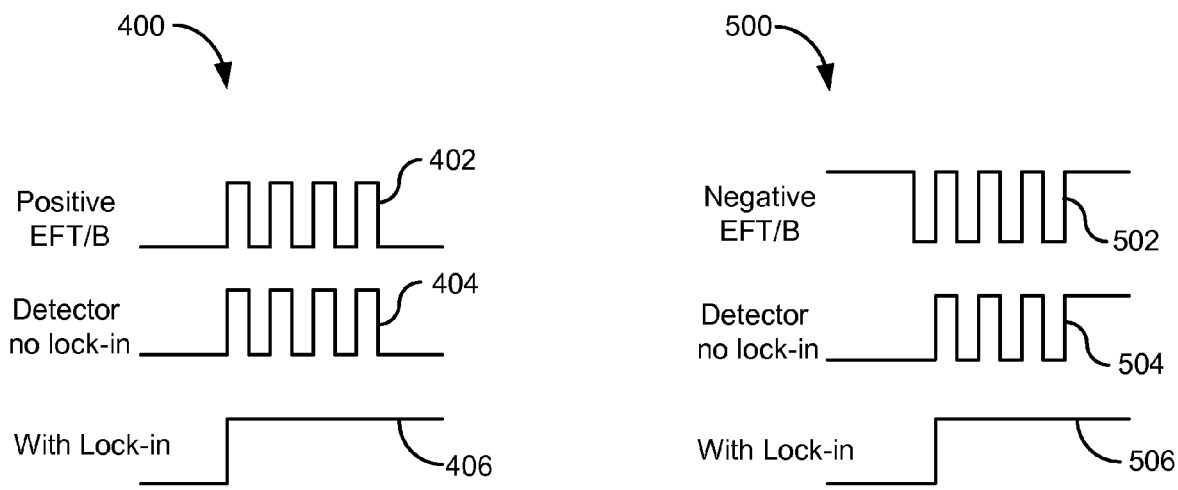
FIG. 5A
FIG. 5B

DETECTION OF AND RECOVERY FROM AN ELECTRICAL FAST TRANSIENT/BURST (EFT/B) ON A UNIVERSAL SERIAL BUS (USB) DEVICE

BACKGROUND

USB technology allows many peripherals to be connected using a single standardized interface socket and improves the plug-and-play capabilities by allowing hot swapping. Hot swapping allows devices to be connected and disconnected without rebooting the computer or turning off the device. USB technology can connect computer peripherals such as a mouse, keyboards, PDAs, gamepads and joysticks, scanners, digital cameras, printers, personal media players, flash drives, and other devices.

A traditional USB cable has four wires and connections. The outside two conductors, VBUS and GND, provide power for the USB device, if needed. The center two conductors, D+ and D−, are the differential data pair which uses half-duplex differential signaling to communicate data between the USB device and a host. Since the differential data pair conductors D+ and D− are physically near the power and ground conductors, an electrical transient from a host power supply can cause noise on the differential data pair conductors D+ and D− and, hence, disrupt data communications between the host and the USB device.

The International Electrotechnical Commission has published IEC 61000-4-4, which is a standard for measuring and testing an electrical fast transient/burst (EFT/B) which can occur on a USB data cable. This standard establishes a common and reproducible reference for evaluating the immunity of electrical and electronic equipment when subjected to EFT/Bs. EFT/B tests are carried out up to +/−2.0 KV or higher with durations of up to 60 seconds. At these voltages and with these time periods, the data transfer between the host and the USB device is corrupted. When this occurs, the host sends a reset command to the USB device, and the USB device attempts to send a series of replies as outlined in the USB specification. However, if the replies from the USB device during the reset sequence are also corrupted by the EFT/B event, then the host will not recognize the replies and eventually stops trying to reset the connection with the USB device. When the host stops trying to reestablish communications with the USB device, the host places the USB port into a suspend mode or state. When a USB port has been placed into a suspend mode, the USB device is manually disconnected and reconnected to the host, which can be irritating and time consuming.

FIG. 1 illustrates a graphical waveform diagram 10 of a data signal 14 affected by an EFT/B sequence 12 on a data bus of a conventional USB device. The individual bursts (designated as B1 through B5) are shown having a typical duration of Tbd. This duration could be 15 ms in duration, for example. The time period of the bursts is shown as Tb. The time Tb could be 300 ms, for example. The times Tbd and Tb could vary, but are shown for illustration purposes.

The exchange of data between the USB device and the host becomes corrupted with each EFT/B event because there is an electric field emitted from the VBUS and GND conductors in the USB cable during each EFT/B strike on the host's power supply. The electric field generated from the EFT/B strike causes the data bus to toggle during the edges of the burst, which disrupts the exchange of data and/or causes data bus states not allowed in the USB specification. These irregularities prompt the host to reset the communication with the USB device. As the reset transaction can be unsuccessful due to the bursts, the host will try unsuccessfully and then put the USB port into suspend mode. Time 0 in FIG. 1 is a time at which the data communications between the USB device and the host are normal until the first EFT/B event B1. The period between the first EFT/B event B1 and Time 1 is the period of time when the host attempts to reset the USB port communications. If unsuccessful, then at Time 1 the host places the USB port and device into suspend mode. Time 2 is a point in time after the EFT/B events have stopped. Although the EFT/B events have stopped by Time 2, the USB port remains in the suspend state until a user manually disconnects and reconnects the USB device to the host.

Traditional methods to improve immunity of USB devices to EFT/B events employ conventional passive implementations. One example of a conventional passive implementation is power filtering using bypass capacitors across the VBUS and GND connections. Another example of a conventional passive implementation is utilizing a high quality USB cable with ferrite core and good shielding characteristics. Another example of a conventional passive implementation is proper shielding of the USB data bus (D+, D−) on the PCB on the USB device. All of these conventional methods result in higher system cost and bigger device size. For protection against extremely strong EFT/B events, these conventional passive methods may not be able to provide sufficient protection, and the host could nevertheless place the USB device into a suspend mode even with passive EFT/B protection.

SUMMARY

Embodiments of an apparatus are described. In one embodiment, the apparatus includes a detector and a watchdog processor. The detector asserts a detector state signal in response to an EFT/B on a USB data channel coupled to a USB chip. The watchdog processor is coupled to the detector. The watchdog processor monitors the detector state signal from the detector. Other embodiments of the apparatus are also described.

Embodiments of a system are also described. In one embodiment, the system is an EFT/B detection and recovery system. The system includes a USB core and a burst controller. The USB core facilitates serial communications with a host device through a USB data channel. The burst controller is coupled to the USB core. The burst controller automatically reconnects the USB core to the host device in response to recognition of a suspend state of the USB core by the host device. Other embodiments of the system are also described.

Embodiments of a method are also described. In one embodiment, the method is a method for managing a USB data channel. The method includes setting a detector state signal in response to an EFT/B. The method also includes monitoring the detector state signal utilizing a watchdog processor. The method also includes automatically reconnecting a USB chip to a host device in response to a suspend state initiated by the host device. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 4 depicts a logic diagram showing one embodiment of the detector of the burst controller of FIG. 2.

FIG. 5A depicts a graphical waveform diagram of one embodiment of the lock-in of the detector state signal upon detection of a positive EFT/B event.

FIG. 5B depicts a graphical waveform diagram of one embodiment of the lock-in of the detector state signal upon detection of a negative EFT/B event.

Throughout the description, similar reference numbers may be used to identify similar elements.

DETAILED DESCRIPTION

While many embodiments are described herein, at least some of the embodiments implement an active method of detection and recovery from an Electrical Fast Transient/Burst (EFT/B) on a Universal Serial Bus (USB) device attached to a host. In particular, embodiments described herein provide an active way to detect the occurrence of an EFT/B and to reestablish communications between the USB device and the host if the host incorrectly places the USB device in a suspend mode after an EFT/B. In this way, the USB device can automatically reattach to, or reestablish communications with, the host if the USB device has been placed into the suspend mode by the host.

Some of the embodiments described herein omit conventional passive devices and implementations. For example, a high quality USB cable (with ferrite core and good shielding characteristics) may be omitted, which translates to lower system cost. In another example, filter/bypass capacitors to eliminate EFT/B may be omitted. Additionally, embodiments which implement an efficient active detection method may result in less restriction in PCB routing, which translates to smaller size.

Figure 2:
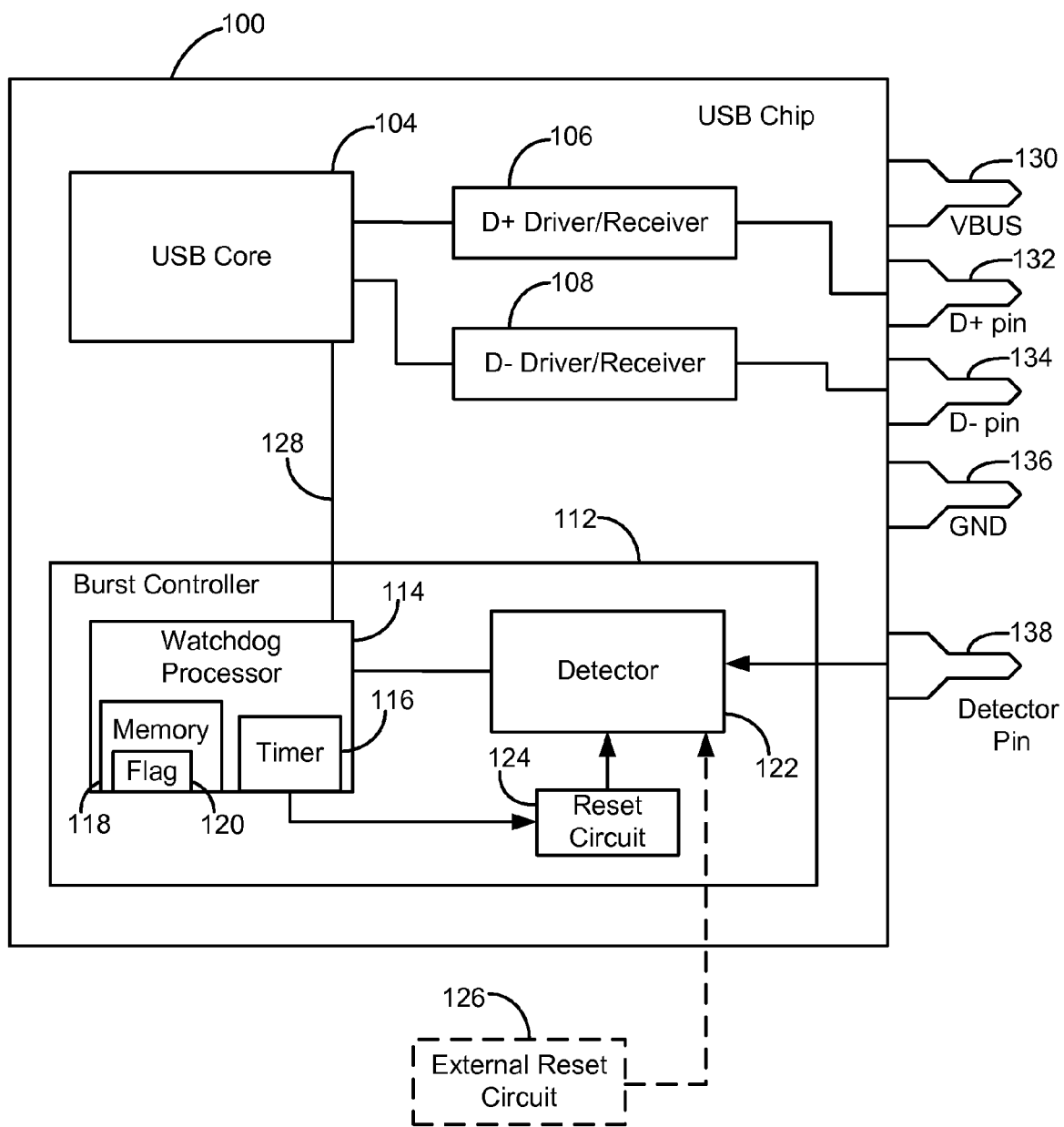
FIG. 2 depicts a schematic block diagram of one embodiment of a USB chip for detecting and recovering from an EFT/B event.

FIG. 2 depicts a schematic block diagram of one embodiment of a USB chip 100 for detecting and recovering from an EFT/B event. The illustrated USB chip 100 includes a USB core 104, D+/D− drivers/receivers 106 and 108, and a burst controller 112. In general, the burst controller 112 functions to detect an EFT/B event and facilitates automatic reconnection of the USB chip 100 with a host device if the host device places the USB chip 100 in a suspend state.

The depicted burst controller 112 includes a watchdog processor 114 which, in turn, includes a timer 116 and a memory 118. In one embodiment, the memory stores a flag 120. The burst controller 112 also includes a detector 122 and a reset circuit 124. In an alternative embodiment, an external reset circuit 126 is connected to the detector 122. The burst controller 112 is connected to the USB core 104 by a communication channel 128, which may be an individual line, a bus, or another type of communication medium capable of passing data or control signals between the burst controller 112 and the USB core 104.

The illustrated USB chip 100 also includes several pins for external connections, for example, to a printed circuit board. In particular, the USB chip 100 includes a voltage supply pin VBUS 130, a positive data pin D+ 132, a negative data pin D− 134, and a ground pin GND 136. In some embodiments, the USB chip 100 also includes a detector pin 138. Although the depicted USB chip 100 includes several components shown and described herein to implement specific functionality, other embodiments of the USB chip 100 may include fewer or more components to implement less or more functionality.

In one embodiment, the USB core 104 facilitates serial communications with a host (refer to FIG. 7) through the data pins 132 and 134 which are connected to a USB data channel (refer to FIG. 7) attached to the host. In general, the USB core 104 transmits outgoing data signals to the D+ and D− drivers/receiver 106 and 108, which transform the outgoing signals for transmission over the USB data channel to the host. Similarly, the D+ and D− drivers/receivers 106 and 108 transform incoming signals, received from the host, into a signal format that is useable by the USB core 104. The D+ and D− drivers/receivers 106 and 108 may be implemented with any suitable type of driver/receiver technology.

In one embodiment, the detector 122 at least partially replicates a data signal from the D+ driver/receiver 106 and/or the D− driver/receiver 108. Although many types of signal replication may be implemented, one example of a type of signal replication involves generating a separate signal that is representative of the signal strength of the corresponding data signal(s). For instance, the detector 122 may generate a replicated signal that is a fraction of the original data signal. In one embodiment, the fractional strength of the replicated signal is within a pull down threshold of signal logic within the detector 122 (refer to FIG. 4). The signal logic may have strong pull down and weak pull up characteristics, as explained in more detail below. As one example, the replicated signal may be less than about 2% of the strength of the corresponding data signal (e.g., about 1 mA). In other embodiments, the replicated signal may be a different fraction of the strength of the corresponding data signal. For example, the replicated signal may be less than about 1%, or less than about 5%, or less than about 10%, or less than about 20%, depending on the type of signal logic which is implemented in the detector 122. Other embodiments may use a different fraction of the strength of the corresponding data signal. Additionally, it should be noted that the strength of the replicated signal may depend, at least in part, on the output low/high drive current (IOH/IOL).

Although the replicated signal is a fractional representation of the data signal(s), the value of the replicated signal nevertheless may rise above the pull down threshold of the signal logic in the detector 122 when an EFT/B event occurs and causes substantial noise on the data lines. In other words, the fraction of the replication is tuned so that the detector is "corrupted" by a relatively low EFT/B event, compared with the strength of an EFT/B event that corrupts the data lines. This allows the detector 122 to detect the presence of an EFT/B event before the EFT/B event can corrupt the USB data communication. In one embodiment, the replicated signal generated by the detector 122 may be provided at the detector pin 138, for example, for testing (i.e., quality assurance), diagnostics, or other purposes.

Figure 3:
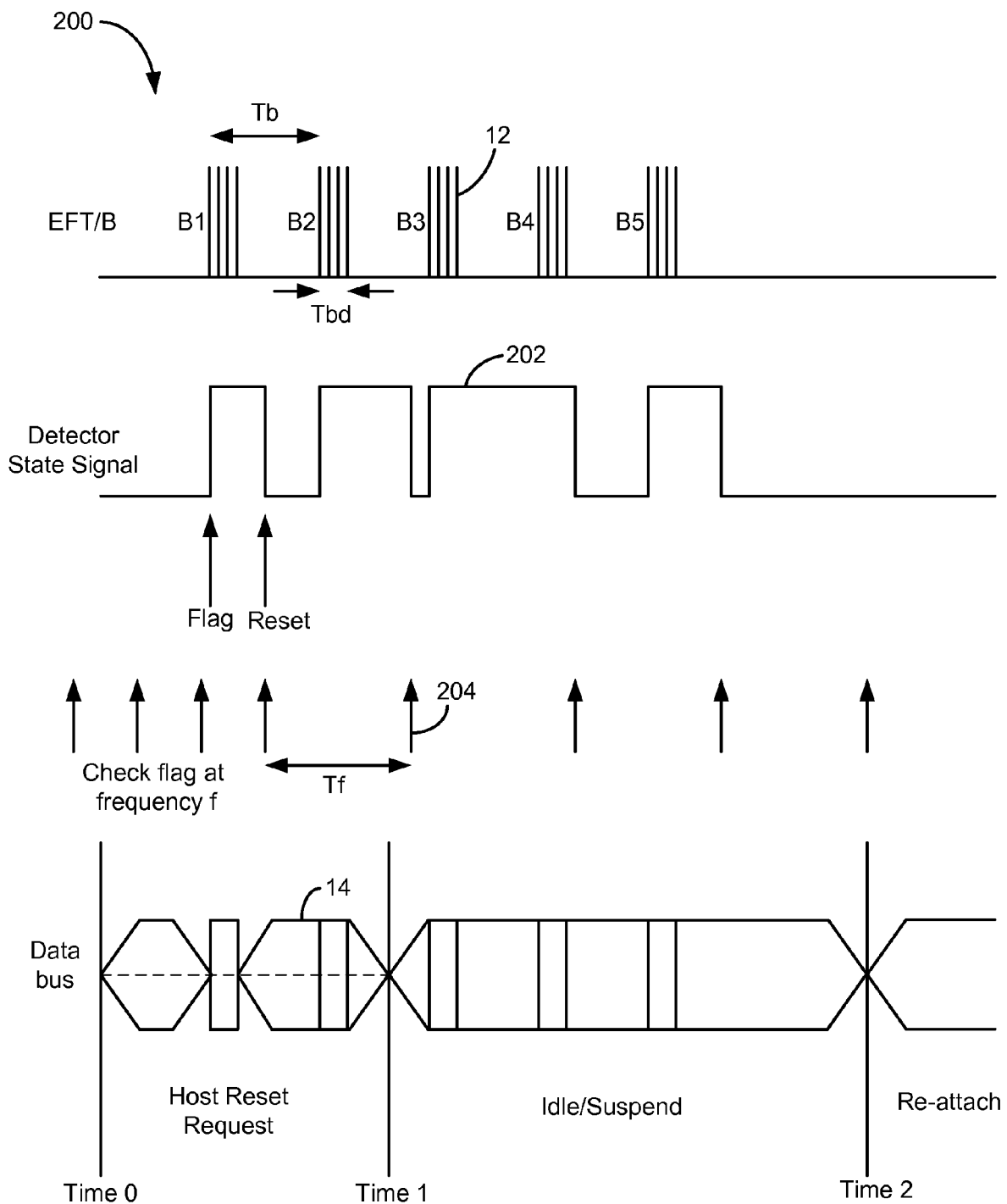
FIG. 3 depicts a graphical waveform diagram of one embodiment of recovery of a data signal affected by EFT/B events.

One example of the detector 122 is shown in FIG. 4 and described in more detail below. In general, the detector 122 uses the replicated signal and generates a detector state signal which depends on the value of the replicated signal. One example of the detector state signal is shown in FIG. 3 and described in more detail below. In one embodiment, the detector state signal is asserted each time an EFT/B event is detected. The asserted state of the detector state signal may be maintained until the detector 122 receives a reset signal from the reset circuit 124 (or the external reset circuit 126).

In one embodiment, the watchdog processor 114 is connected to the detector 122 to monitor the detector state signal. As explained above, the watchdog processor 114 is also connected to the communication channel 128 to allow the watchdog processor 114 to communicate with the USB core 104 and to re-attach the USB core 104 to the host if the host places the USB core 104 into the suspend mode.

In one embodiment, the timer 116 of the watchdog processor 114 provides one or more time periods for use by the watchdog processor 114. Some examples of these time periods may be used for periodic monitoring of the detector state signal, for delay periods when monitoring the detector state signal after an EFT/B event is detected, and for pull down time periods during the automatic reconnection process. In some embodiments, the timer 116 may generate additional time periods for use by the watchdog processor 114. The timer 116 may be included within the watchdog processor 114, as shown, or alternatively may be a separate timer circuit.

In one embodiment, the memory 118 of the watchdog processor 114 stores the program instructions for the watchdog processor 114. The memory 118 also stores one or more status flags and other computational values used by the watchdog processor 114. The memory 118 may be integrated within the watchdog processor 114, as shown, or alternatively may be a separate memory system outside the watchdog processor 114.

In one embodiment, the reset circuit 124 is connected to the watchdog processor 114 and the detector 122. The reset circuit 124 allows the watchdog processor 114 to reset the detector 122. In some embodiments, the watchdog processor 114 controls the reset circuit 124 using one or more control signals. More specifically, the watchdog processor 114 controls the reset circuit 124 to generate a reset signal after a period of time controlled by the timer 116. As explained above, the reset signal resets the detector state signal in response to detection of an EFT/B event.

In some embodiments, implementing the burst controller 112 using active logic within the USB chip 100 allows the USB device to omit to detect and recover from an EFT/B event. For example, conventional passive circuitry may be omitted from the printed circuit board of the USB device. By omitting certain passive components saves cost to the USB device both in the cost of adding components and also in the cost of manufacturing of the USB device itself.

Figure 1:
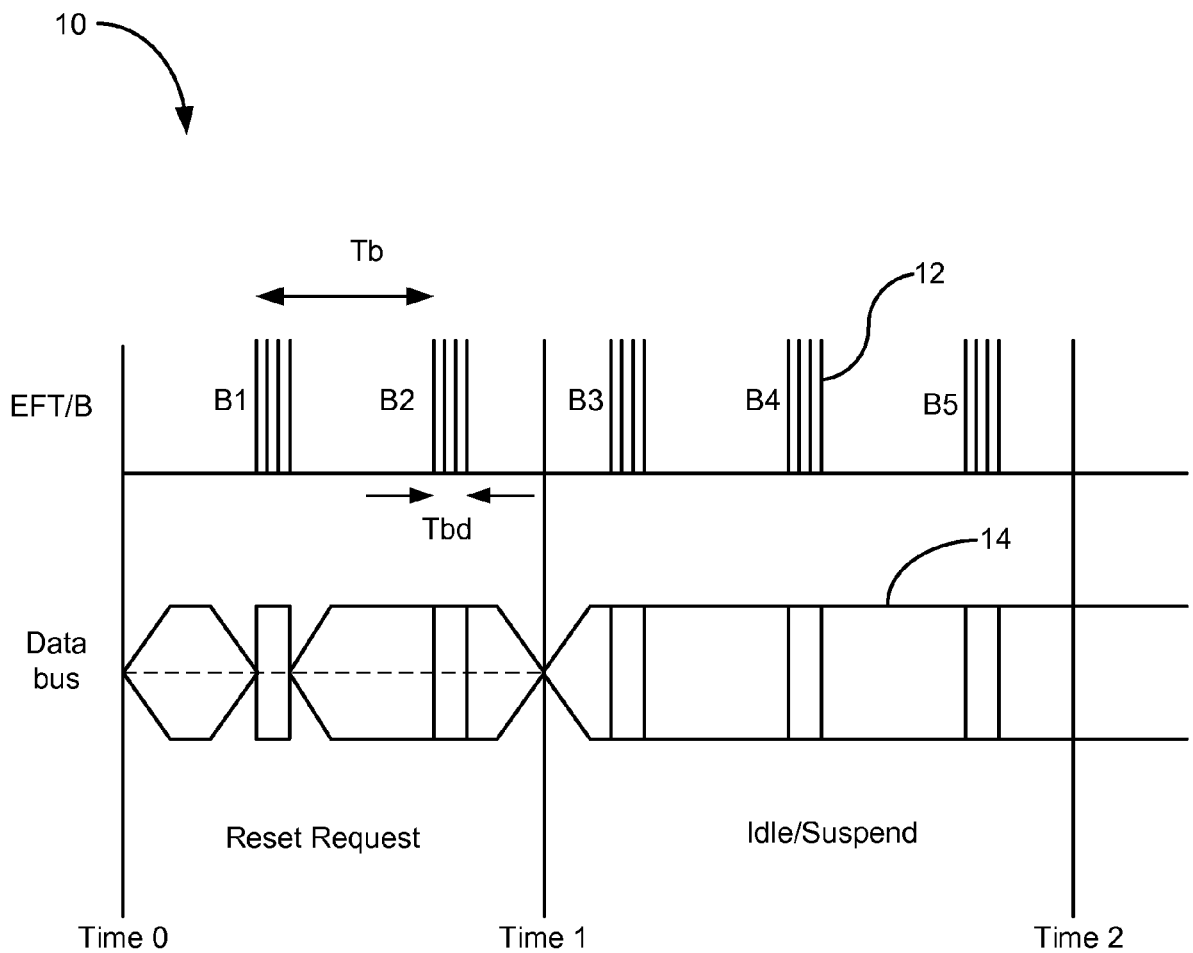
FIG. 1 illustrates a graphical waveform diagram of a data signal affected by an EFT/B sequence on a data bus of a conventional USB device.

FIG. 3 depicts a graphical waveform diagram 200 of one embodiment of recovery of a data signal affected by EFT/B events. In particular, FIG. 3 includes four separate waveforms, including the EFT/B waveform 12, the data signal 14, the detector state signal 202, and a check flag indicator 204. The EFT/B waveform 12 shown is the same as the EFT/B waveform 12 shown in FIG. 1 and described above. This representation shows five EFT/B events, but the number of EFT/B could be more or less than the five EFT/B events shown. The second waveform shows the detector state signal 202, which the detector 122 generates in response to the EFT/B event. In one embodiment, when an EFT/B event occurs the detector 122 sets the detector state signal 202 to a high level. (Alternatively, the detector 122 may set the detector state signal 202 to a low level, if implemented using active low technology.)

The third waveform shows a check flag indicator 204 which is generated by the timer 116 and used by the watchdog processor 114 to reset the detector state signal 202 on a regular basis. In some embodiments, when the detector state signal 202 is set to a high value as a result of detecting an EFT/B event and the watchdog processor 114 detects the high state of the detector state signal 202, the watchdog processor 114 resets the detector 122 utilizing the reset circuit 124. By resetting the detector 122, the detector 122 sets the detector state signal 202 to a low state, for example. Each time the check flag indicator 204 is set, the watchdog processor 114 controls the reset circuit 124 to reset the detector state signal 202. The frequency f of the check flag indicator 204 may be about 3.5 kHz, for example, but the timer 116 may be set to activate the watchdog processor 114 to monitor the detector state signal 202 on a more or less frequent basis.

In a more specific embodiment, the timer 116 sets up a delay time Tf to periodically activate the watchdog processor 114 in order to monitor the detector state signal 202. The Tf period could be 330 ms, for example, but could be more or less than this time period. At the end of the time period Tf, the watchdog processor 114 again looks at the detector state signal 202 and, if the detector state signal 202 is high, the watchdog processor 114 resets the detector state signal 202 and waits for another period Tf to see if the detector state signal 202 is again high. This process continues until the watchdog processor 114 determines that the detector state signal 202 remains low for an amount of time. After the watchdog processor 114 determines that the detector state signal 202 remains low for an amount of time, the watchdog processor 114 checks the USB core 104 to determine if the host has placed the USB core 104 in suspend mode. If not, the watchdog processor 114 resets the detector 122 and then returns to monitoring the detector state signal 202 on a regular or intermittent basis. If the watchdog processor 114 discovers that host has placed the USB core 104 in a suspend mode, the watchdog processor 114 pulls the D+/D− driver/receivers 106 and 108 to a low state for a time period Td. The time period Td could be 10 ms, for example, or another value. If the host starts communications again, the watchdog processor 114 returns to monitor the detector state signal 202 on a regular or intermittent basis. If the host has not established communications with the USB core 104, the watchdog processor 114 again goes through the process of pulling the D+/D− driver/receivers 106 and 108 to a low state for a time period Td and continues this process until the host establishes communications with the USB core 104. Then the watchdog processor 114 returns to monitor the detector state signal 202 on a regular or intermittent basis.

The fourth waveform represents the data signal 14 at the USB core 104. Although the depicted data signal 14 at Times 0 and 1 is similar to the data signal 14 shown in FIG. 1 and described above, at Time 2 the data signal 14 of FIG. 4 illustrates that the burst controller 112 facilitates reconnection of the USB core 104 to the host device after the EFT/B events end (as determined by the watchdog processor 114 by recognizing the low state of the detector state signal 202 at Time 2).

FIG. 4 depicts a logic diagram showing one embodiment of the detector 122 of the burst controller 112 of FIG. 2. In the illustrated embodiment, the detector 122 includes a RESET input, a detector pin connection, and a detector state signal output. The detector 122 also includes a NOR gate 302, a NAND gate 304, and a plurality of inverters 306, 308, 310, and 312. For reference, the inverters 306, 308, 310, and 312 are designated as INV1, INV2, INV3, and INV4. Other embodiments of the detector 122 may be implemented using fewer or more logic gates arranged in a similar or different configuration.

In general, the signal logic within the detector 122 implements a form of a replicator to replicate the data signal(s) on the D+/D− drivers/receivers 106 and 108. More specifically, the NOR gate 302 acts as a driver, and the INV1 306 acts as a receiver. This facilitates a basic replication of the USB data bus drivers/receivers 106 and 108. In some embodiments, the output current drive (IOH/IOL) strength of the NOR gate 302 is a fraction of the D+/D− transmitter drive strength. Additionally, the input logic low/high of the INV1 306 is not critical and can be designed as that of a normal logic (e.g., about ⅓ to ⅔ of the supply).

The RESET input is connected to an input of the NOR gate 302. The inverted signal from the detector pin 138 is also input to the NOR gate 302. Although not specifically shown in FIG. 4, the signal available at the detector pin 138 is the replicated signal, which is described in more detail above. In this embodiment, the replicated signal is a fraction of the drive strength of the signal(s) at the D+/D− drivers/receivers 106 and 108. In this way, the replicated signal can change the state of the output of the NOR gate 302 in response to an EFT/B event, thus causing the INV1 306 to supply a low input of the NOR gate 302. In the absence of the RESET input (i.e., the RESET input is low), the output of the NOR gate 302 goes to the high state until the RESET line is brought high to reset the output of the NOR gate 302.

Once the output of the NOR gate 302 goes high, the INV1 gate 306 output goes low and, hence, the detector state signal 202 output from INV3 310 goes high to indicate the detection of the EFT/B event. Additionally, the output from INV4 312 goes high and is input into the NAND gate 304. In the absence of the RESET signal, the output from the INV2 308 which is input to the NAND gate 304 is also high, so the output of the NAND gate 304 is low. Thus, the high output of the INV3 310 remains high.

When the RESET input is asserted, the output of the NOR gate 302 goes low. Consequently, the detector state signal 202 also goes low. Also, the RESET input at the INV2 308 is high, so the input to the NAND gate 304 is low and, hence, the NAND gate 304 helps to maintain the low state of the detector state signal 202.

In some embodiments, one or more of the logic gates has relatively weak pull-up and strong pull-down characteristics. In a specific embodiment, the inverter gate INV1 306 and the NAND gate 304 are designed such that both gates have weak pull-up and strong pull-down characteristics. The differences in pull-up and pull-down characteristics may help the logic gates to function properly in light of a fractional value of the replicated signal. More specifically, the replicated value may be within the pull-down threshold of the logic gates, so the logic gates treat the replicated value as a logical low signal, while the replicated value of the EFT/B events surpasses the pull-down threshold and, hence, is treated as a logical high signal.

FIG. 5A depicts a graphical waveform diagram 400 of one embodiment of the lock-in of the detector state signal upon detection of a positive EFT/B event. The upper waveform 402 shows four positive EFT/B events. The middle waveform 404 shows the detector state without a latch or other mechanism to lock in the detector state. Hence, the detector state alternates between high and low signal states according to the EFT/B events—the detector state is high each time the replicated signal indicates an EFT/B event. In contrast to the middle waveform 404, the bottom waveform 406 shows the effect of a latch or other mechanism to lock-in the detector state when the first positive EFT/B event occurs. While the detector state signal is locked-in, the detector state signal remains asserted (e.g., high) even when the replicated signal does not indicate EFT/B events (e.g., between sequential EFT/B events).

FIG. 5B depicts a graphical waveform diagram 500 of one embodiment of the lock-in of the detector state signal upon detection of a negative EFT/B event. Similar to the waveform diagram 400 of FIG. 5A, the waveform diagram 500 of FIG. 5 includes an upper waveform of four EFT/B events (although negative, instead of positive), a middle waveform of the detector state without a latch or other mechanism to lock in the detector state, and a bottom waveform to show the effect of a latch or other mechanism to lock-in the detector state in response to the rising edge of the first negative EFT/B event. In other embodiments, the detector state may be correlated with the falling edge of the replicated signal which is representative of the EFT/B event on the data channel.

Figure 6:
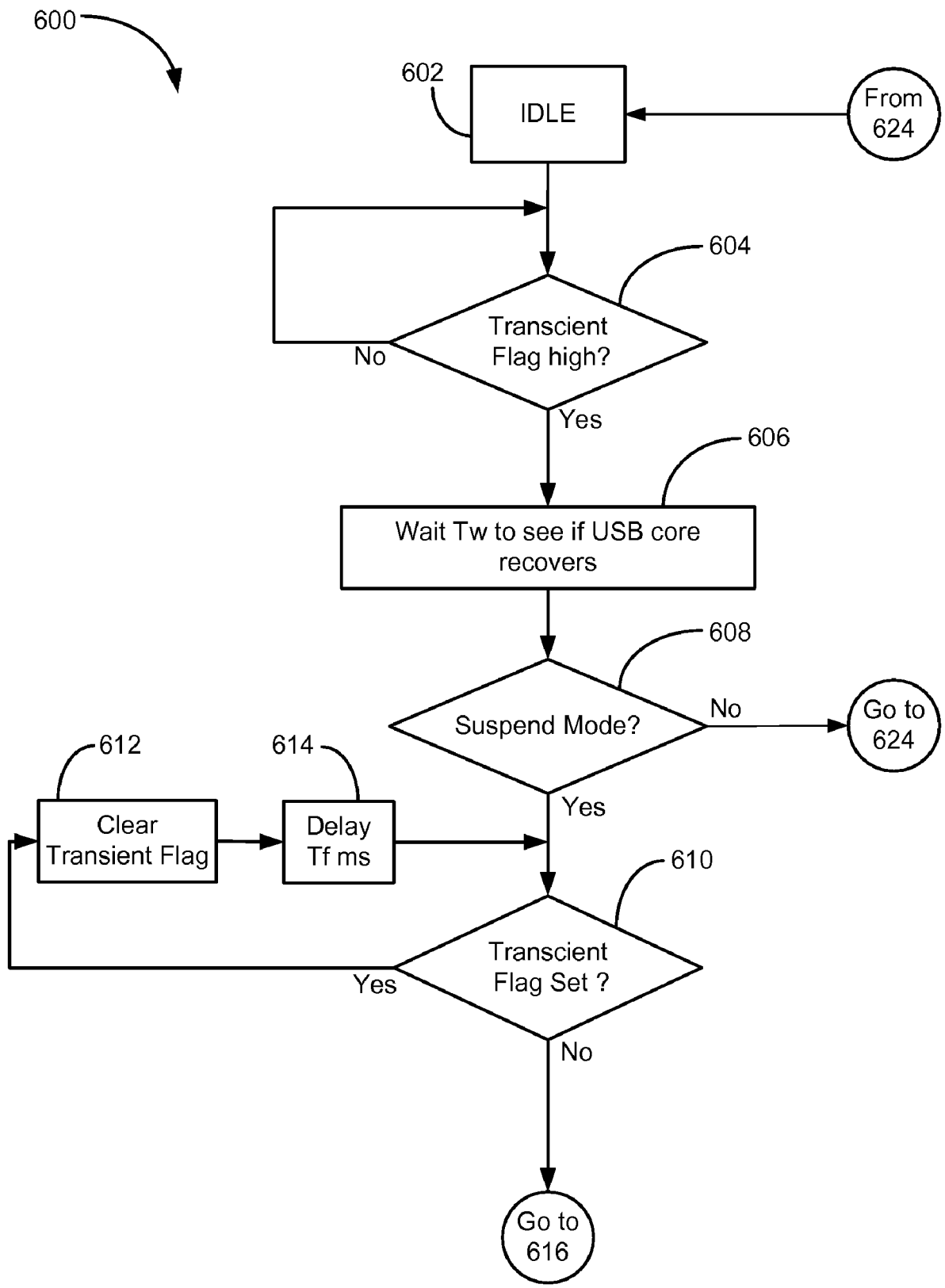
FIG. 6 depicts a flow diagram of one embodiment of a method for detecting and recovering from an EFT/B event.
Figure 6:
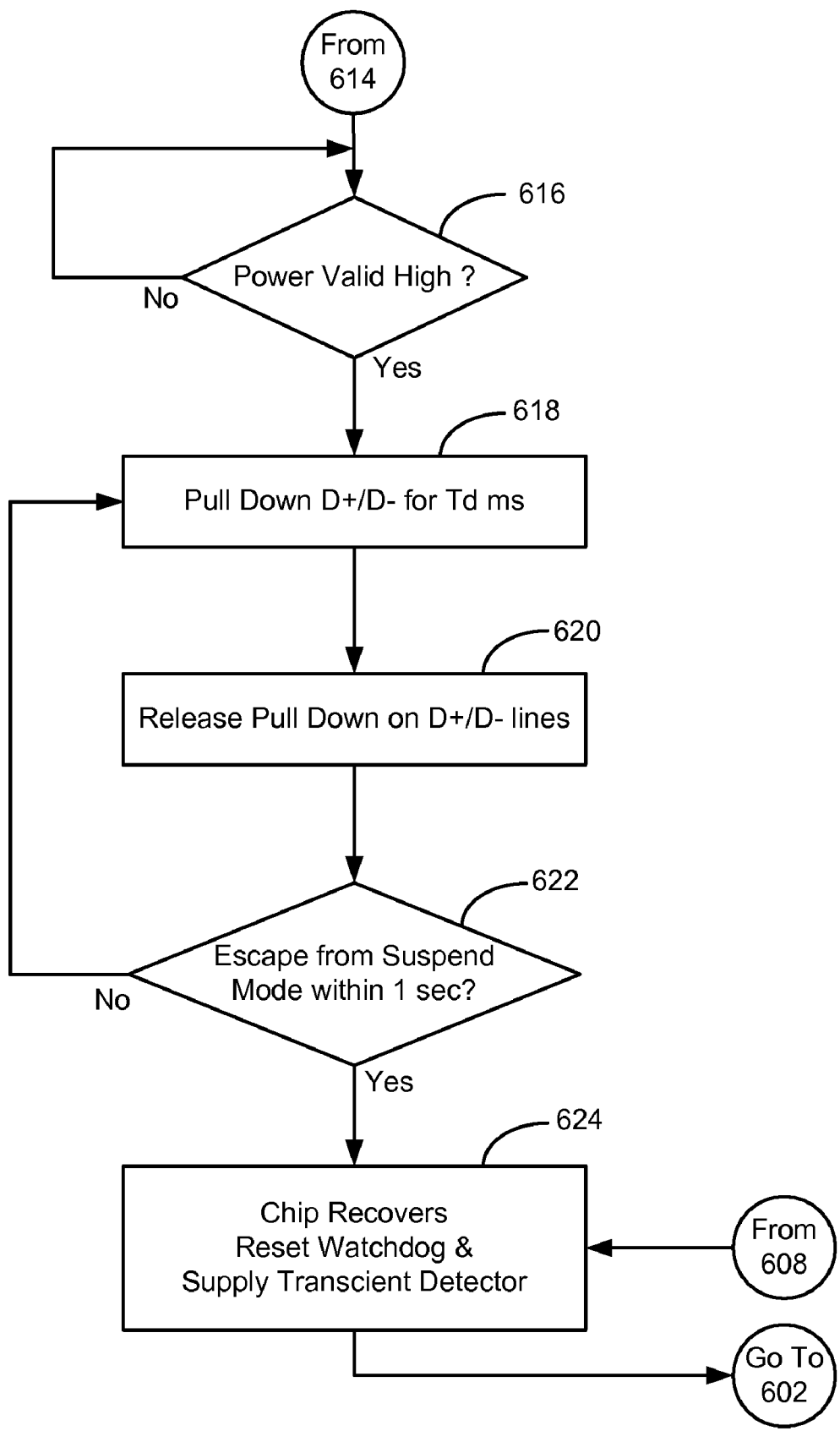

FIG. 6 depicts a flow diagram of one embodiment of a method 600 for detecting and recovering from an EFT/B event. The illustrated method 600 is shown and described in conjunction with the USB chip 100 of FIG. 2. More particularly, at least some of the functionality of embodiments of the method 600 is implemented by the burst controller 112, including the watchdog processor 114 and the detector 122. However, some embodiments of the method 600 may be implemented in conjunction with other types of USB chips and other types of burst controllers.

At block 602, the watchdog processor 114 is in an idle mode. While in the idle mode, the watchdog processor 114 may forego all types of processing other than to wait for a time period to expire or to receive a trigger signal to exit the idle mode. Alternatively, the watchdog processor 114 may nevertheless perform some functions, for example, to perform system checks, actively monitor certain signals, or perform other operations related to the operation of the burst controller 112.

At block 604, the watchdog processor 114 checks a transient flag to determine if the detector state signal 202 is asserted. In one embodiment, the watchdog processor 114 may check a transient flag which is stored in the memory 118 each time the detector state signal 202 is asserted. By storing the transient flag in the memory 118, the transient flag also may be used for debug purposes. Alternatively, the watchdog processor may directly monitor the detector state signal 202 itself as the detector state signal 202 is received from the detector 122. By checking the transient flag or the detector state signal 202, the watchdog 114 can determine if an EFT/B event occurs, since the detector state signal 202 is asserted in response to each EFT/B event. If an EFT/B event does not occur and the transient flag is not set, then the watchdog processor 114 may return to the idle mode and continue to check the transient flag or the detector state signal 202 on a regular or intermittent basis.

If the watchdog processor 114 monitors the transient flag and determines that the detector state signal 202 goes high, then at block 606 the watchdog processor 114 monitors the USB core 104 to determine if the USB core 104 recovers from the EFT/B event on its own. In one embodiment, the watchdog processor 114 waits for a period Tw. As one example, Tw may be between about 10 ms and 100 ms, although other embodiments may use other delay times. In some embodiments, the USB core 104 may recover from the EFT/B event on its own if the EFT/B events stop before the host device stops trying to receive a response from the USB device. The watchdog processor 114 can monitor the state of the USB core via the communication channel 128.

At block 608, the watchdog processor 114 determines if the host has placed the USB core 104 in suspend mode. If not, the watchdog processor 114 resets the detector 122, at block 624 (shown on the continuation sheet for FIG. 6) and then returns to block 602 to continue as described above. Otherwise, if the USB core 104 is placed in suspend mode, then at block 610 the watchdog processor 114 again determines if the transient flag is set or if the detector states signal 202 is asserted. This operation may be substantially similar to the operation shown in block 604 and described above.

If the watchdog processor 114 determines that the transient flag is set and/or the detector state signal 202 is asserted, then at block 612 the watchdog processor 114 clears the transient flag. In one embodiment, the watchdog processor 114 controls the reset circuit 126 to reset the detector state signal 202 to a low state. Additionally, the watchdog processor 114 may clear a transient flag in the memory 118. After clearing the transient flag in the memory 118 and resetting the detector state signal 202, at block 614 the watchdog processor 114 waits for a time delay of Tf. In one embodiment, the time delay Tf is about 330 ms. Other embodiments may use other time periods. At the end of the time delay Tf, the watchdog processor 114 again monitors the transient flag in memory 118 and/or the detector state signal 202. This flag monitoring delay loop, including blocks 610, 612, and 614, repeats as long as the detector state signal 202 is in a high state. In this way, the watchdog processor 114 can identify a sequence of monitoring periods during which the transient flag is not set and, hence, the EFT/B events have stopped.

Once the watchdog processor 114 determines that the EFT/B events have stopped, then at block 616 the watchdog processor 114 determines if there is valid power coming from the host. If there is not power available from the host over the VBUS conductor, then the watchdog processor 114 continues to monitor for valid power from the host. Although not shown, some embodiments may include a timeout period after which the watchdog processor 114 suspends attempts to reconnect to the host.

If the watchdog processor 114 determines that there is power available from the host device, then at block 618 the watchdog processor 114 pulls down the data lines D+/D− 106 and 108 to a low state for a time duration Td. In one embodiment, Td is about 10 ms, although other embodiments may use a shorter or longer time duration. Pulling down the data lines D+/D− 106 and 108 simulates manual disconnection of the USB device from the host device. Subsequently, at block 620 the watchdog processor 114 releases the D+/D− data lines 106 and 108, allowing the signals on the data lines D+/D− to return to a communication state which includes one or more periods of high signals. Releasing the data lines D+/D− 106 and 108 simulates manual reconnection of the USB device to the host device.

After releasing the data lines D+/D− 106 and 108, then at block 622 the watchdog processor 114 monitors the USB core 104 to determine if the host has released the USB core 104 from the suspend mode within a time Te (e.g., 1 second). If the host has not released the USB core 104 from suspend mode, then the watchdog processor 114 returns to block 618 and functions as described above to attempt again to get the host to reset the USB core 104. In some embodiments, the watchdog processor 114 may continue to attempt reconnections for a timeout period or, alternatively, a predetermined number of reconnection attempts.

If the USB core 104 does escape from suspend mode, then at block 624 the watchdog processor 114 resets the burst controller 112, which includes the detector 122, and returns to block 602 to monitor for subsequent EFT/B events. In this way, the watchdog processor 114 can implement a "master" reset of the burst controller 112.

Figure 7:
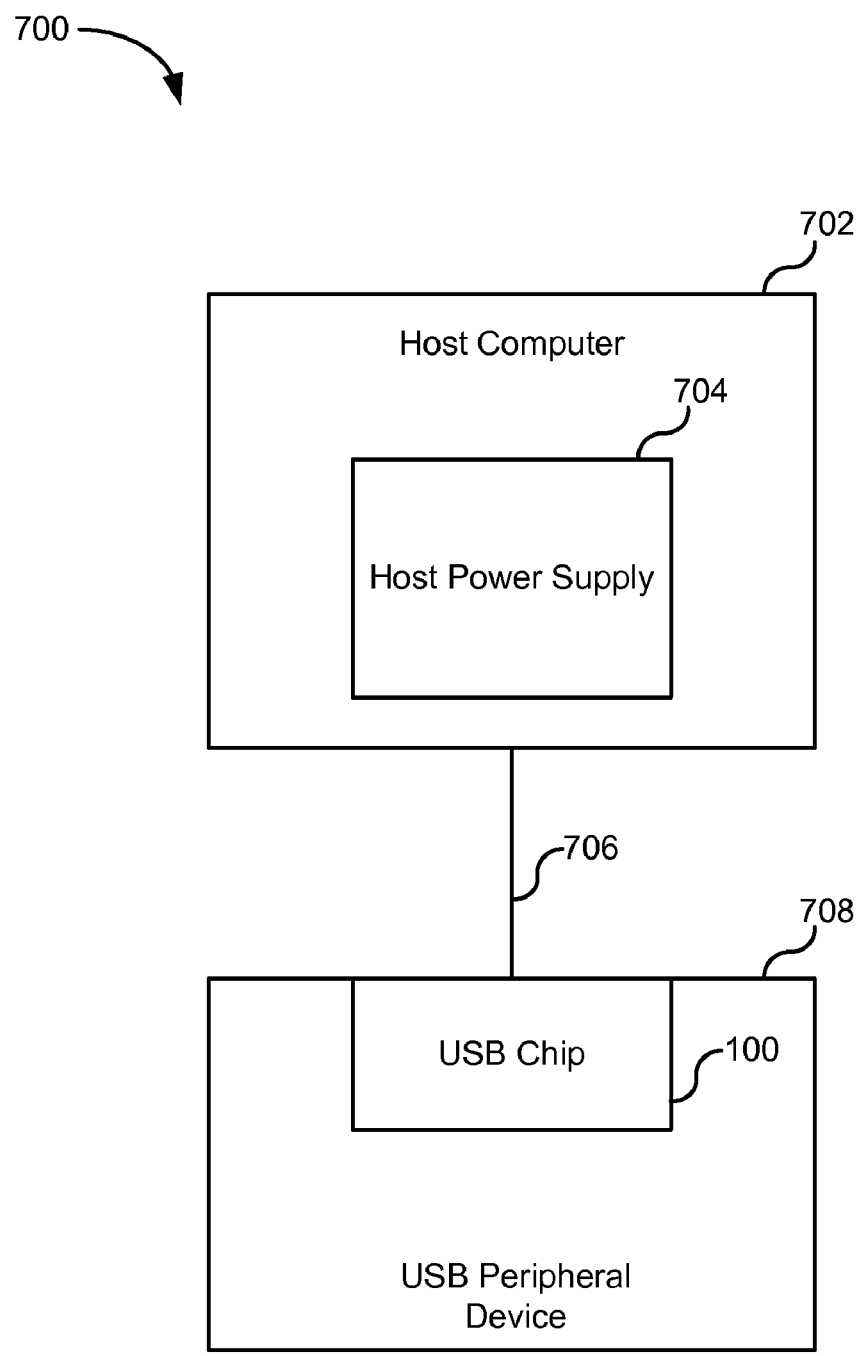
FIG. 7 depicts a schematic block diagram of one embodiment of a system for implementation of the USB chip of FIG. 2.

FIG. 7 depicts a schematic block diagram of one embodiment of a system 700 for implementation of the USB chip of FIG. 2. Although the system 700 is described in conjunction with the USB chip 100 of FIG. 2, other embodiments of the system 700 may be implemented with other types of USB chips which are capable of detection of and recovery from an EFT/B strike. Additionally, some embodiments of the USB chip 100 of FIG. 2 may be implemented in other types of systems.

The illustrated system 700 includes a host computer 702. The host computer may be any type of electronic device which includes a power supply 704 and can be connected by a USB cable 706 to a USB device 708. The host power supply 704 is the source of the EFT/B events that affect the communications between the host computer 702 and the USB device 708. The USB device 708 may be any type of USB device. The USB device 708 includes an embodiment of the USB chip 100.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An apparatus comprising:
   a detector to assert a detector state signal in response to an Electrical Fast Transient/Burst (EFT/B) event on a data channel coupled to a Universal Serial Bus (USB) chip, wherein the detector comprises logic gates to replicate a data signal on the data channel; and
   a watchdog processor coupled to the detector, wherein the watchdog processor is configured to monitor the detector state signal.

2. The apparatus of claim 1, further comprising:
   a USB core; and
   a communication channel to couple the watchdog processor to the USB core, wherein the watchdog processor is further configured to automatically reconnect the USB core to a host device in response to recognition of a suspend state initiated by the host device.

3. The apparatus of claim 2, further comprising a timer coupled to the watchdog processor, wherein the timer is configured to create time periods available to the watchdog processor for monitoring the detector state signal.

4. The apparatus of claim 3, wherein the timer is configured to create a delay period available to the watchdog processor, wherein the delay period represents a time period between attempts to reconnect the USB core to the host device.

5. The apparatus of claim 3, wherein the timer is configured to create a pull down period available to the watchdog processor, wherein the watchdog processor is further configured to facilitate pulling down a signal on the data channel during the pull down period in order to replicate disconnection of the USB core from the host device.

6. The apparatus of claim 1, wherein the logic gates comprise:

a NOR gate to act as a driver; and
an inverter coupled to the NOR gate, wherein the inverter is configured to act as a receiver.

7. The apparatus of claim 1, wherein the detector comprises logic gates to form a latch to provide the detector state signal to the watchdog processor in response to the EFT/B on the data channel of the USB chip.

8. The apparatus of claim 7, wherein at least some of the logic gates have a weak pull-up and a strong pull-down in order to lock-in the detector state signal.

9. The apparatus of claim 1, further comprising a memory coupled to the watchdog processor, wherein the memory is configured to store a status flag, wherein the status flag is configured to indicate a status of the detector state signal, and the memory is further configured to contain program instructions for the operation of the watchdog processor.

10. The apparatus of claim 1, further comprising a reset circuit coupled to the detector and the watchdog processor, wherein the watchdog processor is configured to reset the detector state signal by initiating a reset signal from the reset circuit to the detector.

11. An Electrical Fast Transient/Burst (EFT/B) detection and recovery system comprising:
a Universal Serial Bus (USB) core configured to facilitate serial communications with a host device through a USB data channel; and
a burst controller coupled to the USB core, the burst controller configured to automatically reconnect the USB core to the host device in response to recognition of a suspend state of the USB core by the host device, wherein the burst controller comprises a detector to generate a replicated signal of a data signal on the USB data channel.

12. The EFT/B detection and recovery system of claim 11, wherein the replicated signal has a signal strength that is a fraction of a signal strength of a data signal on the USB data channel.

13. The EFT/B detection and recovery system of claim 11, wherein the detector is further configured to detect an EFT/B event based on the replicated signal and to assert a detector state signal in response to the EFT/B event.

14. The EFT/B detection and recovery system of claim 13, wherein the burst controller further comprises a watchdog processor to monitor the detector state signal.

15. The EFT/B detection and recovery system of claim 13, further comprising an external reset circuit coupled to the detector, the external reset circuit to generate an external reset signal, wherein the detector is further configured to deassert the detector state signal in response to the external reset signal.

16. A method for managing a Universal Serial Bus (USB) data channel, the method comprising:
setting a detector state signal in response to an Electrical Fast Transient/Burst (EFT/B) event;
monitoring the detector state signal utilizing a watchdog processor; and
automatically reconnecting a USB chip to a host device in response to a suspend state initiated by the host device; and
resetting and monitoring the detector state signal periodically until the detector state signal remains in a reset state for a threshold time period.

17. The method of claim 16, further comprising pulling down data lines of the USB chip to a low state, for a pull down time period, to initiate the automatic reconnection with the host device, in response to the host placing the USB chip in the suspend mode.

18. The method of claim 16, further comprising resetting the detector and monitoring the detector state signal subsequent to reconnecting the USB chip to the host device.

19. The method of claim 16, further comprising replicating a data signal on the USB data channel.

20. The method of claim 19, further comprising:
monitoring the replicated data signal relative to a threshold of signal logic within a detector, wherein the threshold corresponds to identification of the EFT/B event; and
asserting the detector state signal in response to the replicated data signal crossing the threshold.

21. An apparatus comprising:
a detector to assert a detector state signal in response to an Electrical Fast Transient/Burst (EFT/B) event on a data channel coupled to a Universal Serial Bus (USB) chip;
a watchdog processor coupled to the detector, wherein the watchdog processor is configured to monitor the detector state signal, wherein the watchdog processor is further configured to automatically reconnect a USB core to a host device in response to recognition of a suspend state initiated by the host device; and
a timer coupled to the watchdog processor, wherein the timer is configured to create a delay period available to the watchdog processor, wherein the delay period represents a time period between attempts to reconnect the USB core to the host device.

22. The apparatus of claim 21, further comprising a communication channel to couple the watchdog processor to the USB core.

23. The apparatus of claim 21, wherein the timer is configured to create time periods available to the watchdog processor for monitoring the detector state signal.

24. The apparatus of claim 21, wherein the timer is configured to create a pull down period available to the watchdog processor, wherein the watchdog processor is further configured to facilitate pulling down a signal on the data channel during the pull down period in order to replicate disconnection of the USB core from the host device.

* * * * *